July 20, 1937. J. E. NYROP 2,087,627

ATOMIZER FOR ATOMIZING LIQUIDS, EMULSIONS, DISPERSIONS, AND THE LIKE

Filed Nov. 9, 1934

INVENTOR
JOHAN ERNST NYROP
ATTORNEYS

Patented July 20, 1937

2,087,627

UNITED STATES PATENT OFFICE 2,087,627

ATOMIZER FOR ATOMIZING LIQUIDS, EMULSIONS, DISPERSIONS, AND THE LIKE

Johan Ernst Nyrop, Copenhagen, Denmark

Application November 9, 1934, Serial No. 752,341
In Denmark November 11, 1933

4 Claims. (Cl. 299—63)

The invention relates to improvements in atomizers for atomizing emulsions, dispersions and the like, hereinafter termed liquids.

The object of the invention is to provide a simple and inexpensive, yet an efficient construction in which two successive atomizing operations are performed upon the liquid, to quickly and thoroughly atomize the same.

With the foregoing in view, the invention resides in the novel subject matter hereinafter described and claimed, description being accomplished by reference to the accompanying drawing.

Figure 1:
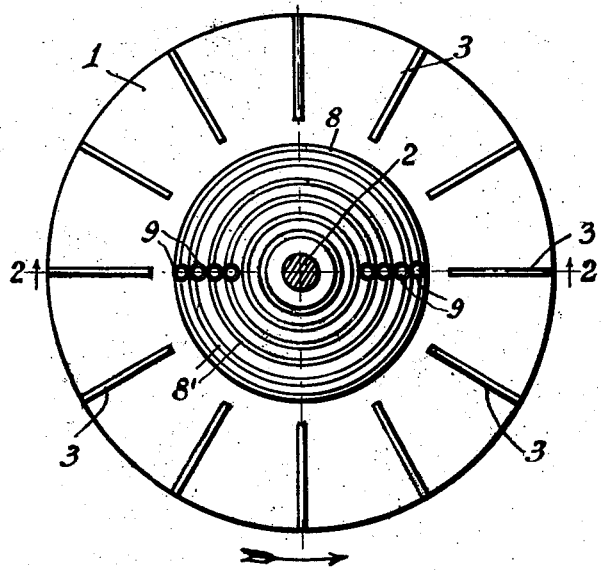

Fig. 1 a top plan view partly in horizontal section showing an atomizer constructed in accordance with the invention.

Figure 2:
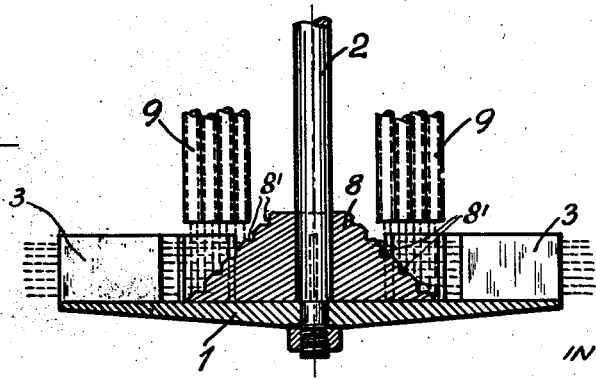

Fig. 2 is a vertical sectional view partly in elevation, on line 2—2 of Fig. 1.

A preferred construction has been shown and will be rather specifically described, with the understanding however, that within the scope of the invention as claimed, variations may be made.

A substantially flat imperforate disk 1 is suitably secured to the lower end of a vertical shaft 2, said shaft being rotatably mounted and driven in any preferred way. Toward its periphery, the disk 1 is provided with circumferentially spaced radially disposed paddles 3 which project vertically therefrom, said paddles being shown of flat rectangular imperforate form. The central portion of the disk 1 is occupied by a cone 8 to which the liquid to be atomized is delivered through a plurality of pipes or passages 9 which are suitably mounted above said cone and are disposed different distances from the cone axis. These pipes or passages 9 deliver small individual streams of liquid onto concentric portions of the cone periphery. Upon striking this periphery, the small liquid streams are deflected laterally from the aforesaid concentric portions and are consequently partially atomized. The paddles 3, being spaced apart around the periphery of the cone, strike and further atomize the partially atomized liquid deflected by said cone. Thus, the invention performs an initial atomizing function and a final atomizing function, producing unusual efficiency.

If desired, the periphery of the cone 8 may be stepped as shown at 8', the stepped formation having a tendency to more uniformly deliver the liquid to the paddles 3.

Excellent results may be obtained from the details disclosed and they may therefore be followed, attention being again invited, however, to the possibility of making variations within the scope of the invention as claimed.

I claim:—

1. An atomizer comprising a cone rotatable about its own axis, a series of liquid-feeding passages disposed different distances from said axis and arranged to deliver small individual streams of liquid onto concentric portions of the conical periphery of said cone, whereby the streams of liquid will be laterally deflected upon striking said concentric portions of the cone periphery and will consequently be partially atomized, a plurality of paddles spaced apart around said periphery of the cone and positioned to strike and further atomize the partially atomized liquid deflected by said cone, and means rigidly connecting said paddles and cone for rotation as a single unit.

2. An atomizer comprising a cone rotatable about its own axis, a series of liquid-feeding passages disposed different distances from said axis and arranged to deliver small individual streams of liquid onto concentric portions of the conical periphery of said cone, whereby the streams of liquid will be laterally deflected upon striking said concentric portions of the cone periphery and will be consequently partially atomized, a plurality of paddles spaced apart around said periphery of said cone and positioned to strike and further atomize the partially atomized liquid deflected by said cone, and a flat disk of circular outline centrally secured to the base of said cone and projecting therefrom in a plane at right angles to the cone axis, the aforesaid paddles being flat, being disposed radially of said cone, and being fixedly secured to said disk in planes perpendicular to the latter.

3. A structure as specified in claim 1; said conical periphery of said cone being provided with circumferentially extending steps.

4. A structure as specified in claim 2; said conical periphery of said cone being provided with circumferentially extending steps.

JOHAN ERNST NYROP.